(12) United States Patent
Schindler et al.

(10) Patent No.: US 6,954,453 B1
(45) Date of Patent: Oct. 11, 2005

(54) METHOD FOR TRANSMITTING DATA IN A TELECOMMUNICATIONS NETWORK AND SWITCH FOR IMPLEMENTING SAID METHOD

(75) Inventors: Sigram Schindler, Berlin (DE); Andreas Illg, Berlin (DE); Karsten Lüdtke, Berlin (DE); Frank Paetsch, Berlin (DE)

(73) Assignee: Teles AG Informationstechnologien, Berlin (DE)

( * ) Notice: Subject to any disclaimer, the term of this patent is extended or adjusted under 35 U.S.C. 154(b) by 0 days.

(21) Appl. No.: 09/147,970

(22) PCT Filed: Oct. 7, 1997

(86) PCT No.: PCT/DE97/02363
§ 371 (c)(1),
(2), (4) Date: Mar. 23, 1999

(87) PCT Pub. No.: WO98/15933
PCT Pub. Date: Apr. 16, 1998

(30) Foreign Application Priority Data

Oct. 7, 1996 (DE) .......................................... 196 42 063
Oct. 23, 1996 (DE) .......................................... 196 45 368

(51) Int. Cl.⁷ ............................................ H04L 12/66
(52) U.S. Cl. ..................... 370/352; 370/395.2; 370/465
(58) Field of Search ................................ 370/352, 353, 370/354, 355, 356, 395.2, 395.21, 395.3, 395.31, 401, 402, 403, 404, 405, 465

(56) References Cited

U.S. PATENT DOCUMENTS

| 4,903,260 A | 2/1990 | Boettle et al. ................. 370/60 |
| 4,996,685 A | 2/1991 | Farese et al. .............. 370/58.1 |

(Continued)

FOREIGN PATENT DOCUMENTS

| EP | 732835 A2 | 9/1996 |
| EP | 0 818 907 A2 | 1/1998 |
| EP | 0 829 986 A1 | 3/1998 |

(Continued)

OTHER PUBLICATIONS

Draft Recommendation H.323: Visual Telephone Systems and Equipment For Local Area Networks Which Provide a Non–Guaranteed Quality of Service, International Telecommunication Union, May 28, 1996, 82 pages.

Y. Nakamura, et al., On a Hybrid Network System of Circuit Switching and Packet Switching, The Transactions of the IECE of Japan, vol. E 65, No. 6, Jun. 1982, pp 679, 680–686 with partial English translation (Abstract).

(Continued)

*Primary Examiner*—Kwang Bin Yao
(74) *Attorney, Agent, or Firm*—Christie, Parker and Hale, LLP

(57) ABSTRACT

A method for transferring data from a first switch to a second switch selectively by line-switching or by packet-switching as well as to a switch for carrying out the method. Data packets are thereby first transferred packet-switched through a packet-switching network to the second switch. With the presence of a corresponding control signal a line-switching connection is estalished from the first switch to the second switch and the data are then transferred through this connection Where applicable a renewed change over to a packet-switching transfer is carried out. A flexible packet-switching or line-switching data transfer linked with dynamic costs between the junctions of a telecommunications network is enabled.

38 Claims, 6 Drawing Sheets

U.S. PATENT DOCUMENTS

| | | | |
|---|---|---|---|
| 5,157,662 A | * 10/1992 | Tadamura et al. | 370/352 |
| 5,347,516 A | 9/1994 | Yoshida | |
| 5,598,411 A | * 1/1997 | Matsukawa | 370/352 |
| 5,610,910 A | 3/1997 | Focsaneanu et al. | 370/351 |
| 5,732,078 A | * 3/1998 | Arango | 370/355 |
| 5,828,666 A | 10/1998 | Focsaneanu et al. | 370/389 |
| 5,905,872 A | 5/1999 | DeSimone et al. | 395/200.75 |
| 5,944,795 A | 8/1999 | Civanlar | 709/227 |
| 5,995,606 A | 11/1999 | Civanlar et al. | 379/201 |
| 6,078,564 A | 6/2000 | Lakshman et al. | 370/235 |
| 6,125,113 A | * 9/2000 | Farris et al. | 370/352 |
| 6,137,792 A | * 10/2000 | Jonas et al. | 370/354 |

FOREIGN PATENT DOCUMENTS

| | | |
|---|---|---|
| EP | 0 848 527 A1 | 6/1998 |
| EP | 0 868 060 A1 | 9/1998 |
| EP | 0 884 860 A2 | 12/1998 |
| GB | 2283154 | 4/1995 |
| WO | WO 90/12466 | 10/1990 |
| WO | WO 95/25407 | 9/1995 |
| WO | WO 95/31060 | 11/1995 |
| WO | WO 97/07625 | 2/1997 |

OTHER PUBLICATIONS

Low, C. et al., "WEB–In—An Architecture for Fast Deployment of In–Based Personal Services". Workshop Record. Intelligent Network. Freedom and Flexibility: Realising the Promise of Intelligent Network Services, Apr. 21, 1996, pp. 1–12.

Babbage, R. et al., "Internet Phone–Changing the Telephony Paradigm?" BT Technology Journal, vol. 15, No. 2, Apr., 1997, pp. 145–157.

* cited by examiner

METHOD FOR TRANSMITTING DATA IN A TELECOMMUNICATIONS NETWORK AND SWITCH FOR IMPLEMENTING SAID METHOD

BACKGROUND OF THE INVENTION

The invention relates to a method for transferring data from a first switch to a second switch, selectively by line switching or by packet switching, and to a switch for carrying out the method.

The present-day situation in telecommunications is marked by a division between two different connecting and switching technologies. These are the synchronous line-switching technology (line-switching or circuit switching) and asynchronous packet-switching technology (packet-switching).

Line-switching connections use line switches, alias line switching equipment, between the individual line sections, each of which copies over 1 byte packets and has a corresponding buffer size. Packet-switching connections use packet switches, alias packet switching equipment, between the individual line sections of a network, each of which copies over multi-byte packets. The buffer size of a packet switch correspondingly amounts to n bytes where n stands for the number of bytes in the copied data packets. The term "switch" is used below so that it includes both a line switch of a line switching network and a packet switch of a packet switching network.

A line switch, alias line switching equipment, is called telecommunications apparatus (TK apparatus) in the private sector, and exchanges of the network supplies in the public sector. A packet switch, alias packet switching apparatus, is also called a router, an IP switch or a host computer.

Line switching connections are synchronous, i.e., data transfer is carried out substantially without any time delay from one line section to an adjoining line section through a switch (here, a line switching apparatus).

When a line-switching call is put through, a connection is continually provided in real time with the complete bandwidth of a channel between two points. Even if no useful information is being sent e.g., during a pause in telephone conversation, the transmission channel is occupied or engaged. Line-switching connections are expensive, particularly during telephone conversations since the costs accumulate irrespectively of the information actually transferred. The advantage of a line switching connection is that it is free of any time delay and has a fixed bandwidth.

The other important type of data exchange nowadays is the packet exchange. With packet exchange, data, e.g., audio data, video data or computer files, are packeted and transferred as data packets. Packet switching works in the asynchronous transfer mode, i.e., data is transferred time-delayed between two adjoining line sections by a switch (here, a packet switching apparatus). In the case of packet-switching exchanges, and quite differently from line-switching exchanges, a fixed connection does not have to be maintained. It is connection-less, i.e., each packet is treated individually and not in conjunction with others.

Packet switching is used in particular on the Internet. The data packets are termed there as IP packets (IP=Internet Protocol). Each IP packet contains a header which contains, inter alia, sender and receiver addresses. The IP packets form a data flow which is transferred through packet switching apparatus (alias IP switches or Routers or Host computers) in the Internet from the sender to the relevant receiver.

As a result of the length of the IP packets (16 bytes or more), a time delay occurs in the packet switching apparatus when copying. This time delay can be so great, when there is a heavy load on the packet switching apparatus which passes a data packet over the route to the destination address, that certain applications are no longer possible.

These delays are of considerable significance particularly in the case of the Internet. With Internet telephony, a cost-conscious caller uses the normal Internet with approximately 8 kbit/s bandwidth and a time delay of 0.5 seconds. When the Internet is overloaded, the time delay of the individual packets becomes so great that an acceptable conversation connection between telephone partners is no longer possible.

Internet telephony is marked by a great advantage that only the relevant local telephone charges to the next POP (Point of Presence), the access point to the Internet offered by an Internet Service Provider ISP, as well as time charges calculated by the ISPs for the length of the Internet access as well as volume charges, but not expensive long distance telephone charges are incurred.

From U.S. Pat. No. 4,996,685 a method and device are known which allow in an ISDN communications network, during an existing connection between a user and a host computer, a dynamic change between a line switching connection through an ISDN B channel and a packet-switching connection through an ISDN D channel. A command to change between a line-switching and a packet-switching connection thereby always emanates from the Host computer.

The method disclosed in U.S. Pat. No. 4,996,685 is restricted to undertaking on an ISDN connection a change between a line-switching and a packet-switching data transfer whereby a line-switching transfer is carried out on a B channel and a packet-switching transfer is carried out on the D channel. A method of this kind is indeed expedient to produce effective access from an end subscriber to a host computer, possibly an exchange point of the telephone network or an access point to the internet, but does not relate to the transfer of data between switches or routers of a network.

WO 95/31060 A1 describes a method for transferring data between an information source and a destination device wherein the data to be transferred are transferred as data packets. Depending on type of information of the data packets, the data are transferred automatically either solely by line-switching or solely by packet-switching. More particularly in the case of small amounts of data to be transferred, a packet-switching transfer is chosen and in the case of large amounts of data, a line-switching data transfer is chosen.

WO 95/25407 A1 describes a method for transferring data between a data source and transceiver either through a packet-switching network or a line-switching network. A control device is thereby provided which uses certain criteria to decide which network and which method of transfer is best suited for the transfer and then selects same.

U.S. Pat. No. 4,903,260 describes a digital coupling network and a coupling field chip which are designed so that paths leading from any input to any output can, depending on requirements, either be switched through for line-switching connections or can be preset for packet-switching information. Preset paths for the packet-switched information thereby form a network whose junctions lie in the coupling field chip of the coupling network. Those function devices which are required to send each data packet on the path preset for same are integrated in the coupling field chips. It is thus possible to divide up a single coupling network depending, on requirements, dynamically into a line-switching network and a packet-switching network.

SUMMARY OF THE INVENTION

Based on the prior art, the present invention is concerned with the problem of providing a method for transferring data from a first switch to a second switch and providing a switching for carrying out the method which, depending on the data origin and headers of a user or network management system, allows flexible data transfer between the switches and more particularly cost-effective data transfer with real time properties.

The solution according to the present invention makes it possible during pocket-switching connection between two switches to achieve a dynamic change-over to line-switching connection without interrupting the connection. This is always advisable if a data build up of data packets exists before the switches of the packet-switching network. Through the establishment of a line-switching connection between the switches, a bypass is produced according to the invention on which data can be transferred with fixed bandwidth and slight time delays substantially in real time so that the data blockage is bypassed. Since a line switching connection is established only when required, i.e., when a packet-switching data transfer no longer has the desired bandwidth, the invention allows a flexible, most cost-effective data transfer.

The term "switch" is used in the sense of the present invention as already explained so that it includes both a line-switch of a line-switching network which copies over 1-byte packets, and a packet-switch (router) of a packet-switching network which copies over multi-byte packets. Data to be transferred can be any type of data, such as audio data, video data or computer files.

The present invention provides for carrying out the method according to the present invention, on switches which allow both line-switching and packet-switching, and combine the functions of a line-switch and a packet-switch. A switch according to the present invention has a packeting device for packeting and unpacketing data, an IP switching device for routing data packets, a line-switching device for establishing connections for switching through data channels and a control device which directs incoming data either to the IP switching device or to the line switching device depending on the control signals.

The corresponding control signals are triggered by a user, or at the command of a network management system and are transferred together with other signaling data to the switch. Alternatively, the switch itself automatically produces a corresponding control command upon exceeding a certain bandwidth of the packet-switching transfer.

The network which consists of interconnected switches according to the present invention forms an Intranet wherein data transfer can be interchanged dynamically between line switching and packet switching and ensures, under normal conditions, data transfer substantially in real time through the possibility of establishing when required, a line-switching connection of a fixed bandwidth. This is particularly important for internet telephony.

There are numerous useful areas for the switches according to the present invention. The switches according to the present invention can even replace conventional line-switches such as TK equipment and exchanges as well as packet switches. More particularly they can be used to build up new networks with real time capacity (intranets) which can operate both by line-switching and by packet-switching.

The method according to the present invention is used in a first embodiment of the invention between two switches which are part of a line-switching network, but not directly part of a packet-switching network. Therefore, for a packet-switching transfer, first a connection is established through the line-switching network from a first switch to an access point to the packet-switching network (such as Internet access point). The data are transferred line-switched to the access point to the packet-switched network, where they are packeted if they do not already exist as packets, and are transferred from the access point packet-switched through the packet-switching network to the second switch. The data are thereby preferably already packeted in the first switch and transferred as data packets line-switched to the access point.

If both switches are part of both a line-switching network and a packet-switching network, then in a second embodiment of the method according to the present invention, a packet-switched data transfer can take place directly between the switches. With both embodiments, with a presence of a corresponding control signal, a line-switching connection is built up through the line-switching network directly to the second switch. If there is no longer any need for a line-switching transfer, then a change back to a packet-switching transfer takes place.

In one embodiment of the method according to the present invention, the data packets remain, after the change-over to a line-switching data transfer, as data packets and are then transferred as such by line-switching. In an alternative embodiment, the data packets are unpacketed, more particularly the headers of the data packets are removed, and only the data are then transferred by line-switching. The advantage of the first embodiment lies in the fact that if the data is once again to be transferred over the packet-switching network, they already exist as data packets and therefore time is saved when switching. The advantage of the second embodiment is that by removing the headers from the individual data packets, the effective bandwidth of the data transfer is increased.

In a preferred embodiment of the method according to the present invention, the same data channel is used for transferring the data packets from the first switch to the access point to the packet-switching network, and for transferring data from a first switch to the second switch through the line-switching network. This embodiment has the advantage that only one data channel is constantly engaged which, depending on the type of transfer, transfers data either to the access point to the packet-switching network, or to the other switch. More particularly in the case of an ISDN network, the same B data channel is used for both sending data to the access point to the packet-switching network, and for sending data through a bypass to another switch.

A data transfer from the first switch to the access point to the packet-switching network always takes place by line-switching. Thus compared with a packet-switching transfer to the access point (e.g., through an ISDN D channel), which is also possible, a larger and fixed bandwidth is ensured up to the access point. If an ISDN network exists, then an ISDN B channel is used as the data channel. Data packets are thereby sent through the B channel by applying them to the ISDN framework. This is known per se and fixed in the PPP protocol.

In a further embodiment, two data channels are provided for data transfer from a first switch, whereby through the first data channel the data packets are transferred to the access point to the packet-switching network, and through the second data channel the data are transferred to the second switch through line-switching. Depending on the type of transfer, either the one data channel or the other data channel is used. This has the advantage that data can be transferred simultaneously by packet-switching and line-switching. By way of example, less important data such as correspondence is transferred by packet-switching and audio data is transferred by line-switching.

In a further preferred embodiment of the present invention, with a line-switching data transfer between the first switch and the second switch or between the first switch and the access point to the packet-switching network, the data of several users are multiplexed on a data channel by forming sub-channels of fixed bandwidth. It is thereby provided that the data of one user are transferred after its selection by line-switching with a transfer rate which corresponds to only a fraction of the transfer rate of the bandwidth which is available as standard to the user.

More particularly with an ISDN network on the B channels sub channels of a bandwidth of 32, 16, 8, 4, 2 or 1 kbit/s are available. To implement the sub-channels, only each n-th byte or each n-th bit of an ISDN frame is copied over immediately and forwarded on the data channel to the next switch or to the computer network access point.

The formation of sub-channels on a data channel, possibly an ISDN B channel or a data channel of the GSM mobile phone system, allows additional flexibility for the data transfer. In many cases, it is entirely adequate that the bandwidth only uses up a part of the bandwidth which is available on a data channel. The use of the sub-channel thereby has an advantage for the user that according to the bandwidth of the sub-channel, lower costs are incurred but a fixed bandwidth is still available. Sub-channels of different bandwidth thereby define different service quality.

Thus a packet-switching transfer, a line-switching transfer with a part of the available bandwidth of a data channel, and a line-switching transfer with the complete bandwidth of the data channel are available as alternatives.

In a further development of the method according to the present invention, with a change from a packet-switching transfer to a line-switching transfer, the address information of the data packets are evaluated and sorted according to network topology. Thus for each data packet whose destination addresses relate to the same topological area of the network, a switch located in this area is selected, a line-switching connection (bypass) is established to the selected switch and the corresponding data or data packets are transferred to the switch by line-switching.

A classification of the data packets is thereby preferably carried out according to geographical points of view, whereby, for data packets whose destination address relate to the same geographical area, a switch located in this geographical area is selected and a line-switching connection is established to this switch. This allows a bypass to be effectively established since for data packets with roughly the same destination, a line-switching connection is established directly to a network junction which lies, regarding network topology, in the destination area of the data packets. The establishment of an effective bypass between the individual switches has great importance in the case of packet-switching networks since a data packet can run on the way from Berlin to Munich via Paris and New York. By bringing together all data packets intended for Munich and transferring these data packets by line-switching directly from Berlin to Munich, it is possible to provide a more effective data transfer.

For classifying data packets according to geographical points of view, it is preferable to compare the destination address with destination addresses stored in a data bank whereby the data bank contains a link between the destination addresses and the associated geographical position. The data bank is thereby preferably integrated in the switch. If the data packets are IP data packets, then the relevant IP addresses are consulted in the data bank and assigned to a certain bypass depending on the geographical destination.

DETAILED DESCRIPTION OF THE DRAWINGS

Figure 2:
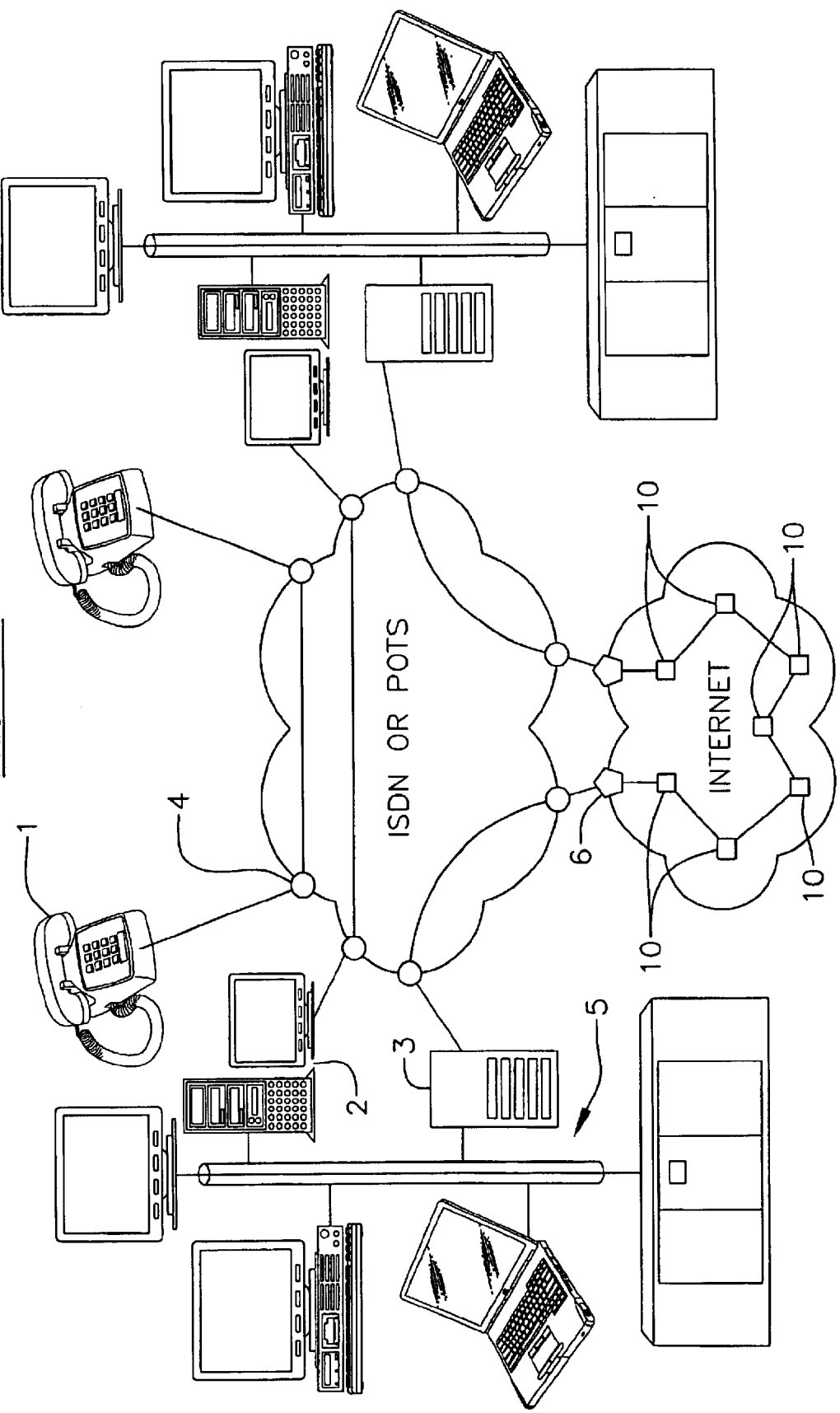
FIG. 2 shows diagrammatically a telecommunications network known in the prior art.

FIG. 2 shows a conventional telecommunications network. Data terminals such as telephone 1 or personal computer 2 are connected to an exchange 4 of the telephone network directly or by means of a telecommunications apparatus (TK-apparatus) 3 through an ISDN/POTS line. Where applicable, a local network LAN 5 is connected to the TK-apparatus 3. The exchanges 4 pass on incoming connection requests and provide line-switching connections. Entry to a packet-switching network is possible through an access point POP (Point of Presence) 6. Data are transferred between interlinked packet switches 10 by packet-switching through the packet-switching network.

The internet will now be considered as packet-switching network without restricting the present invention. Indeed any packet-switching network could be used such as mobile phone networks within the scope of the present invention.

The technologies used are known per se. The data transfer between terminals 1 and 2 and a line-switch (TK apparatus 3 or the exchange 4) takes place line-oriented, and similarly the data transfer between the individual line switches (such as between the individual exchanges 4 and the POP 6 of the Internet Service Providers IPS). The lines are switched through via coupling fields which are produced in the exchange and in the TK-apparatus.

The PCM 30 System is particularly wide spread in ISDN networks wherein 8 Bit codewords for each 30 useful channels within a scanning period of 125 μs are multiplexed and sent in one pulse frame. However, no multiplexing takes place on a single channel. The pulse frame is transferred in constant repetition between sender and receiver even if no useful signals are contained. In the digital coupling field, individual bytes are copied and then sent (switch of 1-byte-packet). Since during the exchange process only one byte is read into a memory each time and then read out again, only a minimal time delay occurs when exchanging the connecting path.

From the access point POP 6 to the Internet, the transfer of data is still only carried out packet-switched on the basis of the known network protocol UDP/IP or TCP/IP. Access to he Internet is brought about by a packet switch hereinafter also called IP Switch) which receives data packets which are not intended for itself and passes them on to the party network whose address they support. During routing, copying of the IP packets is carried out (switch of multi-byte packets). Time delays thereby occur in the packet-switching network according to the size of the IP packet and the number of routers passing on an IP-packet. These time delays can assume such proportions in the event of overloading the IP switches 10 that in the case of the Internet telephony, delays of more than 0.5 s may occur.

Figure 1:
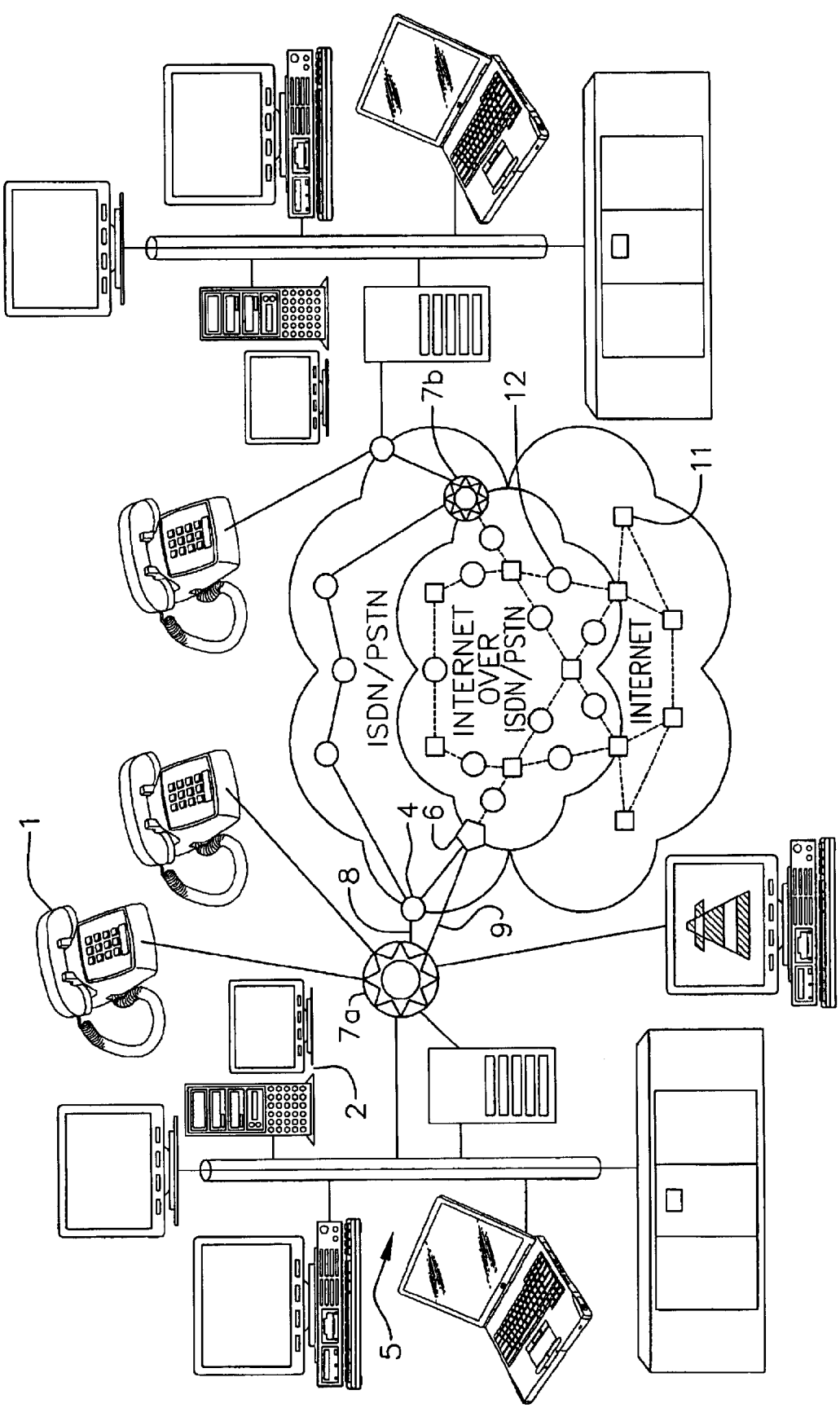
FIG. 1 shows diagrammatically a telecommunications network according to the invention.
Figure 3:
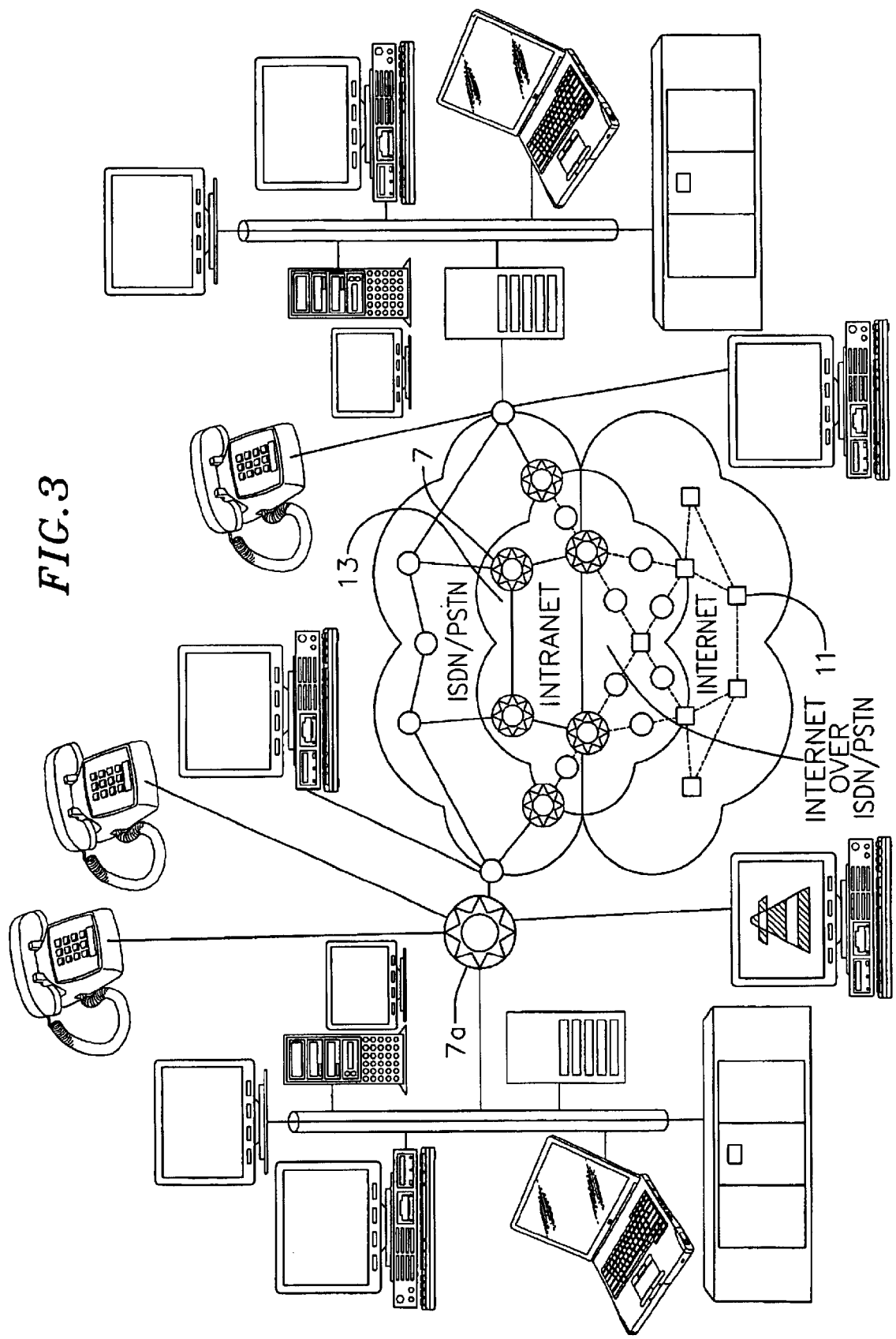
FIG. 3 is a diagrammatic illustration of a telecommunications network in which switches according to the invention form an Intranet.

FIG. 1 shows a telecommunications network according to the present invention with switches 7a and 7b according to the present invention which are shown as starred and are described in detail in FIG. 3 . The switches 7a and 7b integrate the functions of a packet switch and a line switch.

The important factor is therefore the possibility of dynamically switching between packet-switching and line-switching during one transfer, as will be described in further detail below. It is thereby possible to change over, when desired, from an asynchronous packet-switching transfer of variable bandwidth to a synchronous line-switching transfer of greater and fixed bandwidth. Internet telephony and downloading of files from a WWW server are two important uses.

The implementation of the switches 7a and 7b takes place selectively through hardware or software. The line switching, is thereby preferably implemented by hardware and the packet-switching by software. Thus with line switching, after switching through a connection the data are forwarded without further examination, whilst with packet switching the destination addresses of each data packet is evaluated and the next IP switch has to be selected from the routing tables. A switching device for the switches 7a and 7b which undertakes a change over between packet and line-switching is preferably likewise implemented as software.

The switches 7a and 7b can be mounted according to FIG. 1 at different points in the telecommunications network. The switch 7a represents a service access module for connecting the LANs or end terminals 1 and 2 to the ISDN/PSTN network and internet. On the user side, the switch 7a has an ethernet interface for a LAN connection, a printer interface and interfaces for connecting telephones (radio telephones, ISDN telephones, analog telephones) —not shown. The switch 7a is connected to an exchange point 4 of the telephone network through a line 8.

Since the switch 7a is not a part of the internet, it is necessary for the packet-switching transfer of data through the internet to first make a connection with the access point POP 6. This can be carried out through the exchange point 4 or even through a standing line 9 to the POP 6. The data are transferred line-switched up to the POP 6 and are preferably already packeted. If a change to line-switching data transfer is to take place, then a line to another switch is switched through the exchange 4 and the data are transferred to this by line-switching. The switch 7a thus routes the IP switched/line-switched channels to the line 8 controlled by same so that they are more cost-effective or more real time depending on the wishes of the user or provider of the channels.

The switch 7a is integrated in the internet and connected to further IP switches 11 and/or line switches 12. Ideally the network still only consists of switches 7b which allow both line switching and packet switching, so that with each switch 7b there is the possibility where necessary of providing a higher quality line-switching transfer instead of a packet-switching transfer. A line-switched transfer is thereby established as bypass, more particularly between switches where a data blockage builds up.

FIG. 3 shows a telecommunications network wherein switches 7 which allow a data transfer selectively by packet switching or by line switching form an Intranet within the internet. A real time communications possibility is thereby present between the switches 7. So that this is always possible, additional real time communications channels exist between the switches 7. These are additional ISDN/PSTN connections or additional Intranet channels. A line switching connection (bypass) between the switches 7 can thus arise not only through the telephone network, but also through separate channels.

Figure 4:
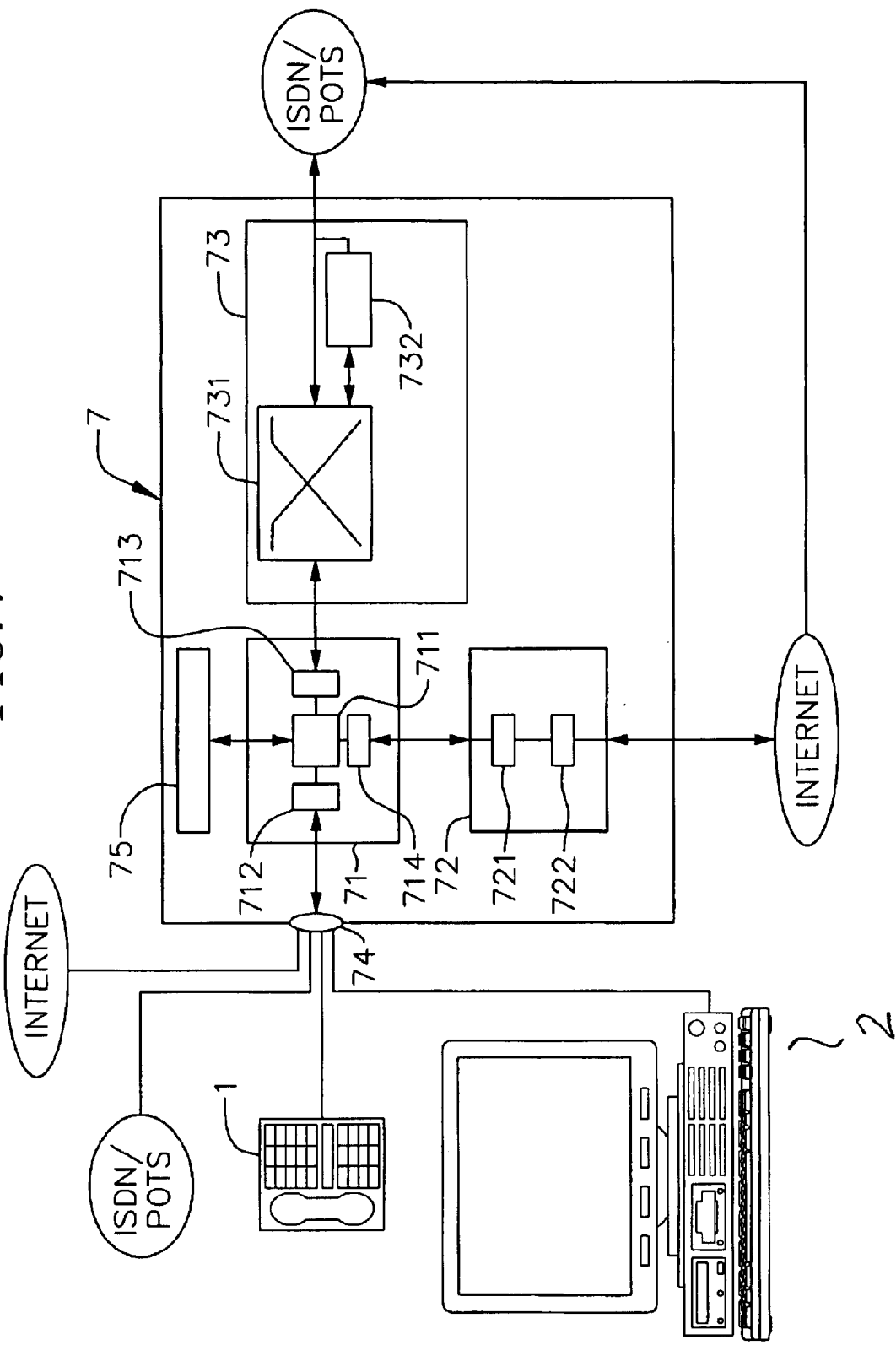
FIG. 4 shows diagrammatically a switch according to the invention.

FIG. 4 shows diagrammatically the establishment of a switch 7 according to the present invention. The switch 7 is part of both a packet-switching network (internet) and a line-switching network (telephone network), i.e., it is connected through lines to further network junctions to which it can transfer or receive line-switched or packet-switched data.

Data coming in through a data input 74 can have any source, more particularly come from an IP switch/router, a line-switch such as an exchange point or a telecommunications unit, from a LAN or from an end terminal 1 or 2. The data input 74 has for this purpose, in a known way, an ethernet interface, an analog interface with A/D converter and an ISDN Interface. In addition where applicable, an ATM interface and an interface with a mobile phone network can also be provided. The ISDN networks are with incoming data of 8 bit long words which arrive on a multiplexed supply line of the switch 7.

The switch 7 has a known IP switch 72 which copies over incoming IP packets (switch of multi-byte packets) and forwards them in the internet to suitable switches according to the address of the packets. These relate to the known internet protocol UDP/IP and TCP/IP. A data compression device 721 is integrated as an option in the IP switch 72. For data compression, a reference is made to the international compression standards developed for individual communications, more particularly the compression process according to ITU standard G.72 X. Furthermore, a coding device 722 for coding data packets can be provided as an option.

Furthermore, the switch 7 has a line switching device 73. This has a digital coupling 731 which is known per se for switching through telephone conversation channels of the line-switching network, and a multiplex/demultiplex device 732 which produces sub-channels on existing data channels, as will be described in further detail below.

The internal control commands, as to whether a packet switching is to take place through the IP switch or a line switching is to take place through the line switching device 73, are produced in a control device 71. The device 71 is substantially a switch which forwards the incoming data either as data packets to the IP switch 72 or as bit flow to the line switching device 73. To this end, the control information of the incoming data are evaluated. The change-over control unit 711 monitors and controls which open connections are present (i.e., which and how many data channels are connected) and which bandwidth the individual data channels require.

In detail the control device 71 has a change-over control unit 711, two packeting/unpacketing devices 713 and 714, and an intermediate register 712. The change-over control unit is connected to a topography data bank 75 which contains geographical data for a number of IP addresses.

If the incoming data are IP packets, then the headers of the IP packets are evaluated by the chance-over control unit 711. If the incoming data are a continuous data stream, then the signaling information of the signaling channel (in band signaling or outband signaling) are evaluated by the change-over control unit 711. The basic state thereby provides that the incoming data are sent into the internet through the IP switch 72. If the incoming data do not yet exist as IP packets then they are packeted into corresponding IP packets in the packeting/unpacketing device 714 and sent to the IP switch.

If the data exist as IP packets but are to be transferred line-switched through the line-switching device 73 then the data are, where applicable, unpacketed in the packeting/unpacketing device 713. More particularly the headers, of the data packets are removed. Unpacketing is optional however and not absolutely necessary since data packets can be transferred line-switched where applicable according to the PPP protocol. The (packeted or non-packeted) data are transferred as bit stream to the line switching device 73 by the change-over control unit 711.

Through a control command which is sent by an end terminal or another switch and for example triggered by a user by pressing a certain button on the terminal or by the network management system, the type of communication is switched over to line-oriented or packet-oriented communication.

A corresponding signaling command for changing between packet and line switching is, for example, represented by a certain bit sequence wherein the switching unit 71 stores the detailed incoming data in an intermediate register 712 and compares it with stored bit sequences. If a certain bit sequence exists, then a change over to a different type of switching is carried out. Alteratively, it can also be possible for the change-over control device 711 to monitor the bandwidth of a transfer and on understepping or exceeding a certain bandwidth and/or in the event of a time delay when forwarding IP data packets to automatically release a control command to change over to the relevant other type of transfer.

To change from packet switching to line switching, first at the command of the control unit 71, a connection is made via the line-switching unit 73 (bypass) with another switch (destination switch). To this end, the ISDN signaling command SETUP is sent to the next exchange point. After the connection is established, all the incoming data of the communications connection considered are no longer directed through the IP-switch 72 but through the line-switching unit 73. The data are now transferred by line-switching with fixed bandwidth through the established bypass to the other switch.

The change-over control unit 711 thereby checks, within the scope of the change-over process and prior to sending the data to the device 73, whether they are IP packets and whether unpacketing is to take place in the packeting/unpacketing device 713. The decision on this is made dependent on control signals of the network management system or the end terminal or alternatively by the change-over control unit 711 itself dependent on the data arrival. The control signals here contain corresponding transfer parameters. In each case, the data after being sent to the device 73 are then exposed in the coupling field 731 to an ISDN data frame.

To establish the most effective line-switching connection possible, it is important to select a suitable destination switch where the bypass is established. To this end, a switch is selected as destination switch which lies in a geographical area which coincides with the destination address of numerous IP packets. Then in particular, these IP packets are transferred through the bypass to the corresponding destination switch so that the data packets still only have a short transfer path from the destination switch to the final destination.

The classification of the IP packets and selection of a corresponding destination switch takes place by means of the topology data bank 75 which contains a geographical link between a number of IP addresses and their geographical position. In the line switching device 73, the IP destination address of each packet is compared with the addresses stored in the data bank 75 and in the event of a successful association of the IP address, this is given a code. This can be a number which characterizes a certain geographical region. This code is recognized by the coupling field 731 and the data packet is then switched through to the corresponding destination switch.

Since it would result in too much time delay to interrogate the data bank 75 for each data packet, the change-over control unit 711 contains a cache which can be quickly accessed and in which the result of the last data bank inquiry is stored. If the IP address of a data packet arriving through the data input 74 is stored in the cache, then the corresponding code can be quickly given.

If the IP address is not contained in the cache, then a data bank inquiry is carried out, and the IP packets are directed onto the IP switch 72 until the result of the data bank inquiry is provided. Only then is a change-over made for this data to a line-switching transfer through a bypass. It is thereby possible that several bypasses to different destination switches exist at the same time whereby the change over control unit 711 controls the coupling field 731 so that the data packets are each time sent to the destination switch which is most favorable from the network topological point of view. The change-over control unit 711 thus informs the coupling field 731 of which data is to be sent to which destination switch.

If the destination address of a data packet is not contained in the data bank 75, then those intermediate junctions of the packet-switching network are checked to be fully functioning which are normally run through when sending data packets with a certain destination address. To this end, the corresponding data are exchanged between the individual network junctions in known way by trace routing. At the appropriate intermediate junctions, i.e., the intermediate junctions with low functioning output, it is determined whether the ISDN number is known and this is requested where applicable. The chance-over control unit 711 of the data bank 75 is thereby operated in the manner already described. A bypass is then established from the change-over control unit 711 to a switch which lies in the chain of switches as close as possible to the destination switch.

The multiplex/demultiplex device 732 of the line-switching device 73 allows, depending on the control commands of the change-over control unit 711, a line-switching transfer to sub-channels with a bandwidth which corresponds to a fraction of the usual bandwidth of a data channel considered. Data channels are thereby bundled which are formed or determined in the coupling field 731 according to the control commands of the change-over control unit 711. A time multiplex channel of the PCM 30 system is considered as ISDN data frame which has information of 30 data channels and two signal channels. The bandwidth of the data channels each amounts to 64 kbit/s.

The multiplex/demultiplex device 732 allows a multiplexing inside each of the 30 data channels of the time multiplex channel. To this end, two methods are alternatively used. In a first method only a part of the 8 bit of a PCM Word is switched through each other, thus 1, 2 or 4 bits. The bandwidth is reduced accordingly to 8, 16 or 32 kbit/s. The data of several channels are in this way multiplexed on one data channel.

Alternatively a PCM word (byte) of the time multiplex channel of the PCM 30 system is not switched through in each of the successive pulse frames, but only in each n-th pulse frame whereby the bandwidth is reduced to 64/n kbit/s.

The two multiplex methods described can also be combined. By way of example, one bandwidth of 1 kbit/s is produced for one data channel in that each eight bit in each eighth frame of the ongoing data channel stems from the data channel considered.

The switching through in the line switching device 731 takes place, depending on the selected data rate, and in the case of transfer rates per data channel unequal to 64 kbit/s, includes the multiplex/demultiplex device 732. If no multiplexing takes place on a data channel, then the data are passed by the multiplex/demultiplex device 732.

For the channel or sub-channel considered, a line-switching transfer takes place to the switch which represents the other side of the line-switching connection until a control command again reaches the device 71 to switch over again to packet-switching. This command is in turn coded by a certain bit sequence or is produced automatically. Then through the control device, the switched-through line is broken off and the incoming data are then again directed to the IP switch 72.

Figure 5A:
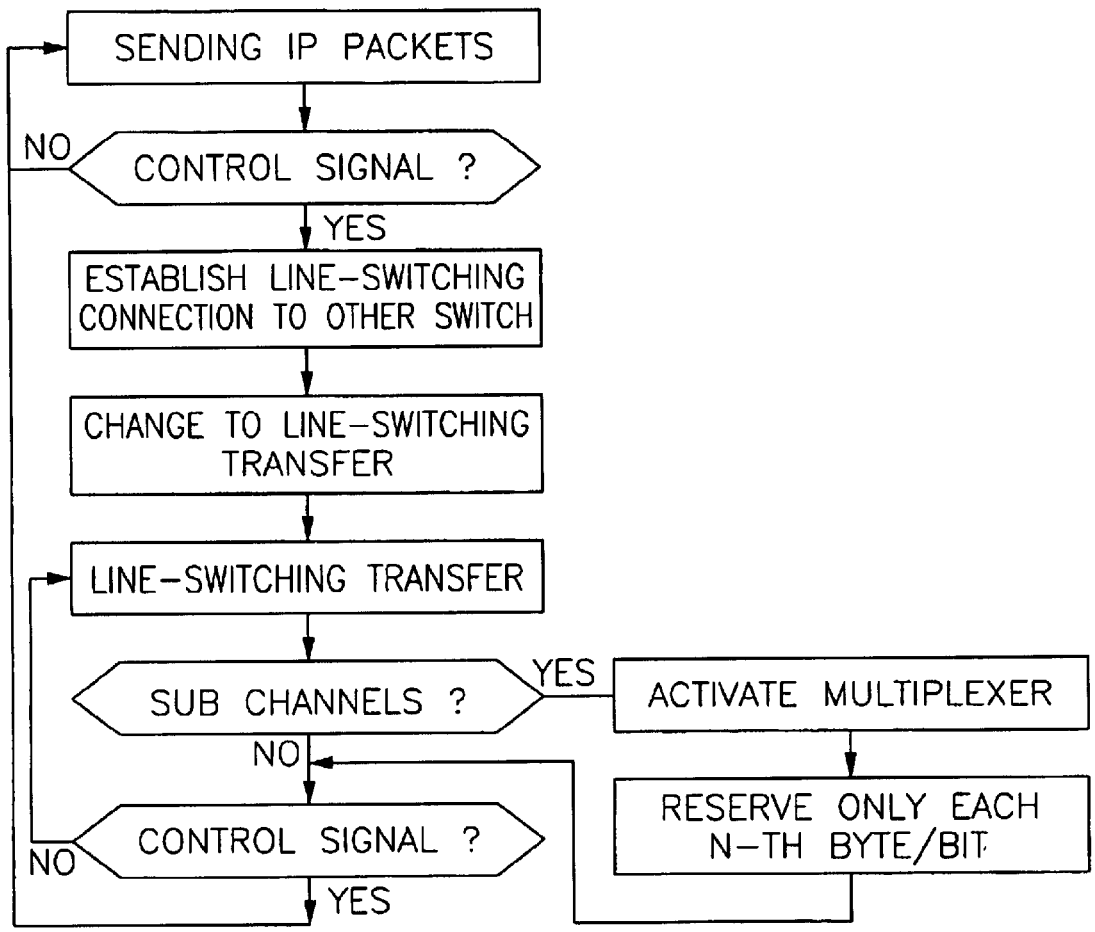
FIG. 5a shows a flow chart of the method according to the invention for transferring data between two switches.
Figure 5B:
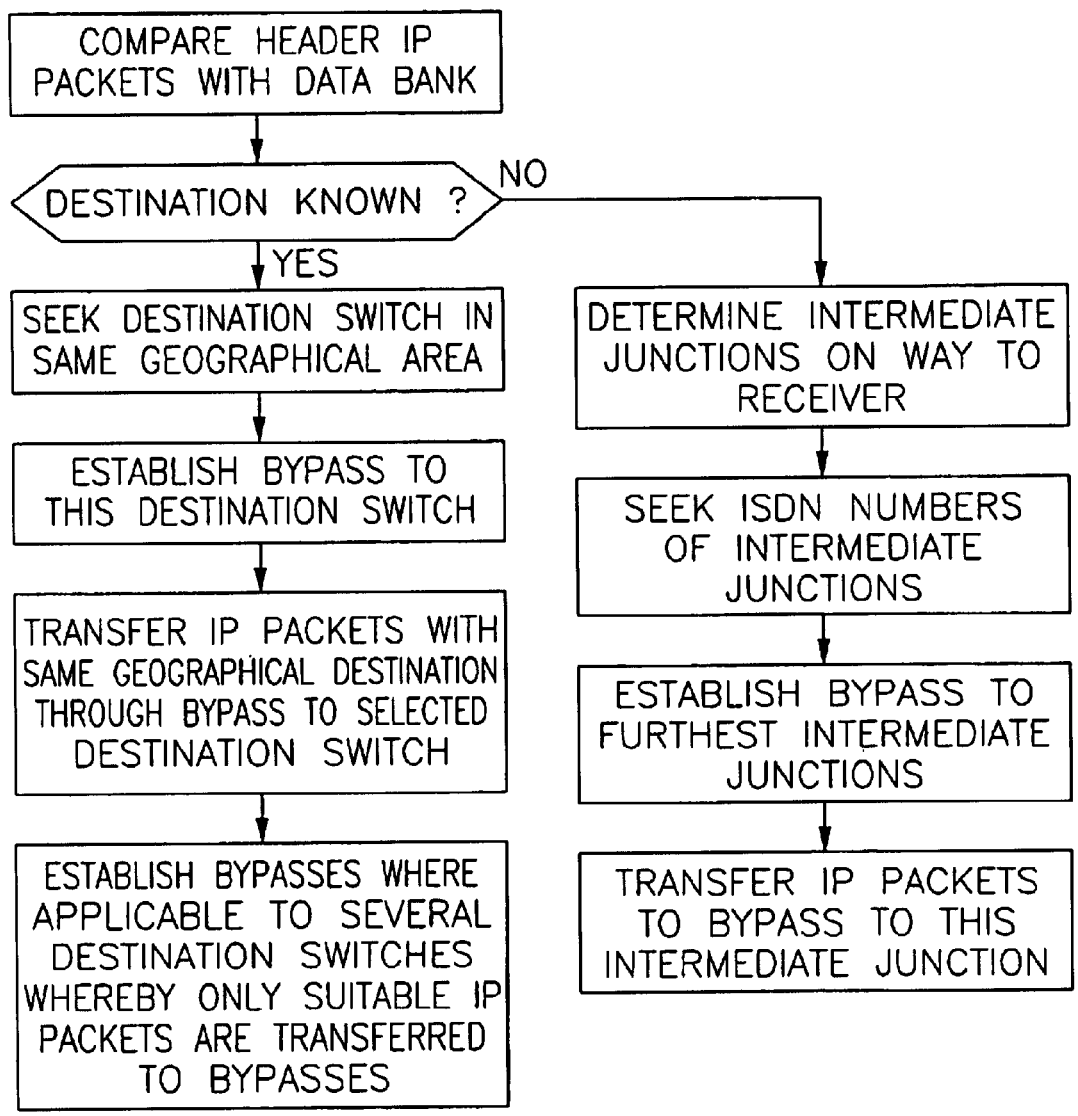
FIG. 5b shows diagrammatically a flow chart for the method according to the invention for selecting a destination switch through topological points of view.
Figure 3:
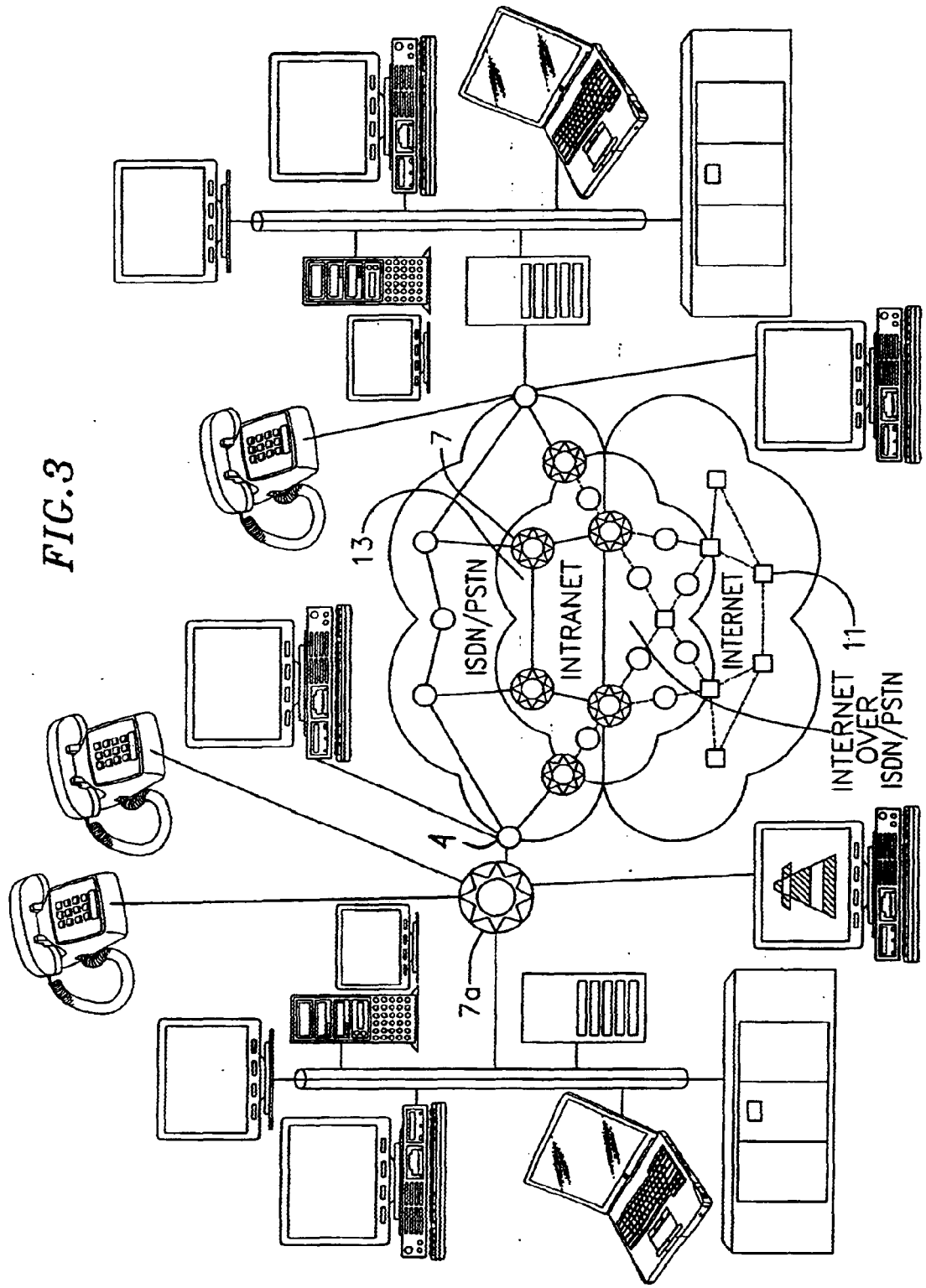

FIGS. 5a and 5b show the method sequence. FIG. 5a shows the course of the method when changing from a packet-switching data transfer to a line-switching data transfer between two switches. With the presence of a corresponding control signal, a line-switching connection is set up to another switch and the data sent by line-switching.

If a line-switching data transfer is to take place to sub-channels of fixed bandwidth then a multiplexer/demultiplexer is activated which multiplexes several data streams so that each time only every $n^{th}$ bit and/or every $n^{th}$ byte is reserved in the outgoing data stream for an incoming data stream. It can thereby be provided that the individual sub-channels have a different bandwidth, i.e., the different input data streams have different proportions in the outgoing data stream. With the presence of a further control signal, a change back to a packet-switching transfer is undertaken.

FIG. 5b shows the selection of a suitable switch when establishing a bypass. To this end, the headers of the IP data packets are compared with the information of a data bank. If the header information is associated with a certain geographical destination, then the bypass is established to a switch mounted in this geographical area. If the header information is not associated with a certain geographical destination, then as described above, a bypass is made to an intermediate junction where the data packets pass through in the normal case. Where applicable, the switch has numerous bypasses to different switches wherein each time only data packets with the same or similar topological destination features are transferred to the individual switches within the frame of the bypass.

The present invention is not restricted in its design to the embodiments given above. Rather a number of variations are possible which make use of the invention even in fundamentally different types of designs.

What is claimed is:

1. A method for transferring data from a first end terminal to a second end terminal using a first switch and a second switch, selectively by line-switching or packet switching, comprising:
    a) locating the first switch between the first end terminal and an access point of a packet-switching network, the first switch being part of a line-switching network or having access to a line-switching network;
    b) establishing a connection via the first switch through the line-switching network from the first end terminal to the access point of the packet-switching network;
    c) line-switching transferring of non-packetized data through said connection from the first end terminal to the access point of the packet-switching network;
    d) packeting of the data into data packets and packet-switching transferring of the data packets through the packet-switching network from the access point to the second switch;
    e) checking repeatedly whether a control signal exists for transferring to a line-switching connection to the second switch;
    f) establishing the line-switching connection, during an existing transfer, through the line-switching network from the first switch to the second switch with a presence of the control signal, if the line-switching connection is not yet present; and
    g) changing-over to a line-switching data transfer during the existing transfer and transferring data over the line-switching connection to the second switch and from the second switch to the second end terminal.

2. The method of claim 1, wherein the first end terminal is a telephone.

3. The method of claim 2, wherein the telephone is an analog telephone.

4. The method of claim 2, wherein the telephone is an ISDN telephone.

5. The method of claim 2, wherein the telephone is a mobile telephone.

6. The method of claim 1, wherein the first end terminal is part of a local area network.

7. The method of claim 1, wherein the first end terminal is connected to a private branch exchange (PBX), which is in turn connected to the first switch.

8. The method of claim 1, wherein the data transferred from the first end terminal to the access point of the packet-switching network are analog data.

9. The method of claim 8, wherein the data, when transferred over the line-switching connection to the second switch, remain as analog data.

10. The method of claim 1, wherein the data transferred from the first end terminal to the access point of the packet-switching network are digital, non-packetized data.

11. The method of claim 1, in which transferring the data over the line-switching connection comprises transferring the data over an PSTN/ISDN network.

12. The method of claim 1, in which transferring the data through the packet-switching network comprises transferring the data through the internet.

13. The method of claim 1, wherein the first switch is located at the first end terminal.

14. The method of claim 1, wherein the control signal which triggers a change-over between the packet-switching transfer and the line-switching transfer is produced automatically when demands on a quality of a data transfer, including a time delay or a noise proportion, is understepped or exceeded.

15. The method of claim 1, wherein the control signal which triggers a change-over between the packet-switching transfer and the line-switching transfer is produced by a user of the first end terminal.

16. The method of claim 1, wherein, when the data is being transferred using the line-switching data transfer, further comprising:
   a) checking repeatedly whether a second control signal exists for changing-over to a packet-switching data transfer to the second switch;
   b) establishing a second connection through the line-switching network, during the existing transfer, from the first switch to the access point of the packet-switching network with a presence of the second control signal, if the connection to the access point is no longer present;
   c) changing-over to a packet-switching data transfer during the existing transfer;
   d) line-switching transferring of the data through the connection or the second connection to the access point;
   e) packeting of the data into data packets and packet-switching transferring of the data packets through the packet switching network from the access point to the second switch; and
   f) transferring the data from the second switch to the second end terminal.

17. The method according to claim 1, wherein, with the line-switching data transfer between the first switch and the second switch or between the first switch and the access point to the packet-switching network, the data of several end terminals are multiplexed on one data channel by forming sub-channels of a fixed bandwidth.

18. The method according to claim 1, wherein, with a data transfer from the first switch changing over from a packet-switching data transfer to the line-switching data transfer,
   a) address information of the data packets are evaluated and classified according to a network topology, and
   b) for the data packets whose destination addresses correspond to a same topological area of the network, the second switch is selected which is located in the same topological area.

19. The method according to claim 18 wherein, to classify the data packets according to the network topology, the destination addresses of the data packets are sorted according to geographical areas whereby, for data packets whose destination addresses correspond to a same geographical area, the second switch is selected to be located in this geographical area.

20. The method according to claim 19 wherein, for classifying the data packets according to geography, the destination addresses are compared with destination addresses stored in a data bank which contains a link between the destination addresses and associated geographical areas.

21. A method for transferring data from a first end terminal to a second end terminal, selectively by line-switching or packet switching, comprising:
   a) establishing a connection through a line-switching network from the first end terminal to an access point of a packet switching network;
   b) line-switching transferring of non-packetized data through said connection from the first end terminal to the access point of the packet-switching network;
   c) packeting of the data into data packets and packet-switching transferring of the data packets through the packet-switching network from the access point to the second end terminal;
   d) checking repeatedly whether a control signal exists for transferring to a line-switching connection to the second end terminal;
   e) establishing the line-switching connection, during an existing transfer, through the line-switching network from the first end terminal to the second end terminal with a presence of the control signal, if the line-switching connection is not yet present; and
   f) changing-over to a line-switching data transfer during the existing transfer and transferring data over the line-switching connection to the second end terminal.

22. The method of claim 21, wherein the first end terminal is a telephone.

23. The method of claim 22, wherein the telephone is an analog telephone.

24. The method of claim 22, wherein the telephone is an ISDN telephone.

25. The method of claim 22, wherein the telephone is a mobile telephone.

26. The method of claim 21, wherein the first end terminal is part of a local area network.

27. The method of claim 21, wherein the data transferred from the first end terminal to the access point of the packet-switching network are analog data.

28. The method of claim 27, wherein the data, when transferred over the line-switching connection to the second end terminal, remain as analog data.

29. The method of claim 21, wherein the data transferred from the first end terminal to the access point of the packet-switching network are digital, non-packetized data.

30. The method of claim 21, in which transferring the data over the line-switching connection comprises transferring the data over an PSTN/ISDN network.

31. The method of claim 21, in which transferring the data through the packet-switching network comprises transferring the data through the internet.

32. The method of claim 21, wherein the control signal which triggers a change-over between the packet-switching transfer and the line-switching transfer is produced automatically when demands on a quality of a data transfer such as a time delay or a noise proportion is understepped or exceeded.

33. The method of claim 21, wherein the control signal which triggers a change-over between the packet-switching transfer and the line-switching transfer is produced by a user of the first end terminal.

34. Switching apparatus for routing a telephone call comprising non-packetized data from a first end terminal located at a user's premises to a second end terminal located at another user's premises, selectively by line switching or packet switching, the switching apparatus comprising:
   means for establishing a connection through a line-switching network to the second end terminal;
   means for line-switching transferring data received from the first end terminal as non-packetized data over the line-switching network to the second end terminal;
   means for establishing a connection through a packet-switching network to the second end terminal;
   means for packet-switching transferring data received from the first end terminal as non-packetized data over the packet-switching network to the second end terminal; and
   means responsive to a control signal for transferring to a line-switching transfer or a packet-switching transfer to the second end terminal;

said means responsive to a control signal changing-over to a line-switching data transfer or a packet-switching transfer during the existing transfer with the presence of said control signal.

35. The switch of claim 34, further comprising means to produce the control signal for transferring to a line-switching transfer or a packet-switching transfer to the second end terminal, said control signal being produced automatically when demands on the quality of the data transfer are understepped or exceeded.

36. The switch of claim 34, wherein the data received from the first end terminal are analog data.

37. The switch of claim 36, wherein the data, when transferred over the line-switching connection to the second end terminal, remain as analog data.

38. The switch of claim 34, wherein the data received from the first end terminal are digital, non-packetized data.

* * * * *

UNITED STATES PATENT AND TRADEMARK OFFICE
CERTIFICATE OF CORRECTION

PATENT NO.       : 6,954,453 B1
APPLICATION NO.  : 09/147970
DATED            : October 11, 2005
INVENTOR(S)      : Schindler et al.

It is certified that error appears in the above-identified patent and that said Letters Patent is hereby corrected as shown below:

In the Drawings

FIG. 3, Sheet 3 of 6           Delete Drawing Sheet 3 and substitute therefore the Drawing Sheet, consisting of Fig. 3, as shown on the attached page

On the Title Page

(56) References Cited           Delete "EP   732835 A2  9/1996",
Foreign Patent Documents        Insert --EP   0 732 835   A2  9/1996--

(57) Abstract, line 7           Delete "estalished",
                                Insert --established--

(57) Abstract, line 9           After "connection",
                                Insert --.--

In the Claims

Column 13, line 37, Claim 18    Delete "are",
                                Insert --is--

Signed and Sealed this

Third Day of October, 2006

JON W. DUDAS
*Director of the United States Patent and Trademark Office*

US006954453C1

(12) EX PARTE REEXAMINATION CERTIFICATE (10550th)

United States Patent
Schindler et al.

(10) Number: US 6,954,453 C1
(45) Certificate Issued: Mar. 27, 2015

(54) METHOD FOR TRANSMITTING DATA IN A TELECOMMUNICATIONS NETWORK AND SWITCH FOR IMPLEMENTING SAID METHOD

(75) Inventors: Sigram Schindler, Berlin (DE); Andreas Illg, Berlin (DE); Karsten Lüdtke, Berlin (DE); Frank Paetsch, Berlin (DE)

(73) Assignee: Teles AG Informationstechnologien, Berlin (DE)

Reexamination Request:
No. 90/010,017, Aug. 30, 2007

Reexamination Certificate for:
Patent No.: 6,954,453
Issued: Oct. 11, 2005
Appl. No.: 09/147,970
PCT Filed: Oct. 7, 1997
PCT No.: PCT/DE97/02363
§ 371 (c)(1),
(2), (4) Date: Mar. 23, 1999
PCT Pub. No.: WO98/15933
PCT Pub. Date: Apr. 16, 1998

Certificate of Correction issued Oct. 3, 2006

(30) Foreign Application Priority Data

Oct. 7, 1996 (DE) .................................. 196 42 063
Oct. 23, 1996 (DE) .................................. 196 45 368

(51) Int. Cl.
| | | |
|---|---|---|
| H04Q 3/00 | (2006.01) | |
| H04L 29/06 | (2006.01) | |
| H04Q 11/04 | (2006.01) | |
| H04L 12/64 | (2006.01) | |
| H04M 3/42 | (2006.01) | |
| H04M 7/00 | (2006.01) | |
| H04L 12/66 | (2006.01) | |
| H04L 12/24 | (2006.01) | |
| H04L 12/701 | (2013.01) | |
| H04L 12/54 | (2013.01) | |
| H04L 12/725 | (2013.01) | |

(52) U.S. Cl.
CPC ............. *H04M 7/0057* (2013.01); *H04L 12/66* (2013.01); *H04L 41/5009* (2013.01); *H04L 45/00* (2013.01); *H04L 12/6418* (2013.01); *H04Q 11/0428* (2013.01); *H04L 41/5025* (2013.01); *H04M 7/006* (2013.01); *H04L 12/5692* (2013.01); *H04M 3/4228* (2013.01); *H04L 29/06* (2013.01); *H04Q 3/002* (2013.01); *H04L 45/30* (2013.01); *H04L 41/12* (2013.01); *H04L 69/18* (2013.01); *H04L 2012/6475* (2013.01); *H04Q 2213/13292* (2013.01); *H04Q 2213/13389* (2013.01); *H04L 2012/6427* (2013.01); *H04Q 2213/13031* (2013.01); *H04Q 2213/13209* (2013.01); *H04Q 2213/13196* (2013.01); *H04L 2012/6472* (2013.01); *H04L 2012/6443* (2013.01); *H04Q 2213/13298* (2013.01); *H04Q 2213/13175* (2013.01)
USPC ......................... 370/352; 370/395.2; 370/465

(58) Field of Classification Search
None
See application file for complete search history.

(56) References Cited

To view the complete listing of prior art documents cited during the proceeding for Reexamination Control Number 90/010,017, please refer to the USPTO's public Patent Application Information Retrieval (PAIR) system under the Display References tab.

*Primary Examiner* — Ovidio Escalante

(57) ABSTRACT

A method for transferring data from a first switch to a second switch selectively by line-switching or by packet-switching as well as to a switch for carrying out the method. Data packets are thereby first transferred packet-switched through a packet-switching network to the second switch. With the presence of a corresponding control signal a line-switching connection is established from the first switch to the second switch and the data are then transferred through this connection.
Where applicable a renewed change over to a packet-switching transfer is carried out. A flexible packet-switching or line-switching data transfer linked with dynamic costs between the junctions of a telecommunications network is enabled.

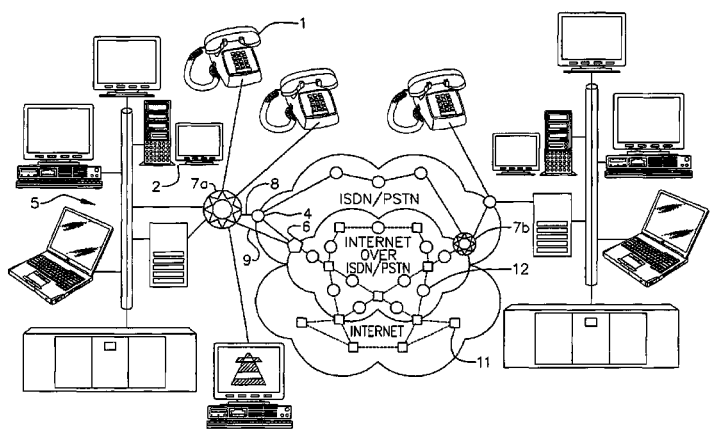

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 34-36 and 38 are cancelled.

Claims 1-33 and 37 were not reexamined.

\* \* \* \* \*